United States Patent
Hafeez et al.

(10) Patent No.: US 11,546,803 B2
(45) Date of Patent: Jan. 3, 2023

(54) TIME-DIVISION COMMUNICATION ANALYSIS AND BANDWIDTH ALLOCATION IN A WIRELESS NETWORK

(71) Applicant: Charter Communications Operating, LLC, St. Louis, MO (US)

(72) Inventors: Abdulrauf Hafeez, Cary, NC (US); Maulik V. Vaidya, Palmdale, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/924,498

(22) Filed: Jul. 9, 2020

(65) Prior Publication Data
US 2021/0392549 A1  Dec. 16, 2021

Related U.S. Application Data

(60) Provisional application No. 63/037,420, filed on Jun. 10, 2020.

(51) Int. Cl.
| | |
|---|---|
| *H04W 28/20* | (2009.01) |
| *H04L 41/0896* | (2022.01) |
| *H04L 41/5054* | (2022.01) |
| *H04W 24/02* | (2009.01) |
| *H04W 16/14* | (2009.01) |
| *H04W 28/12* | (2009.01) |
| *H04W 48/18* | (2009.01) |
| *H04L 5/14* | (2006.01) |

(52) U.S. Cl.
CPC ......... *H04W 28/20* (2013.01); *H04L 41/0896* (2013.01); *H04L 41/5054* (2013.01); *H04W 16/14* (2013.01); *H04W 24/02* (2013.01); *H04W 28/12* (2013.01); *H04W 48/18* (2013.01); *H04L 5/14* (2013.01)

(58) Field of Classification Search
CPC . H04W 48/16; H04W 28/16; H04W 72/0473; H04W 4/021; H04W 72/048; H04L 67/125

See application file for complete search history.

(56) References Cited

U.S. PATENT DOCUMENTS

| | | | |
|---|---|---|---|
| 9,585,023 B2* | 2/2017 | Ji | H04W 72/048 |
| 2015/0156645 A1* | 6/2015 | Ponnuswamy | H04W 24/06 370/241 |
| 2015/0373722 A1* | 12/2015 | Lange | H04W 52/46 370/315 |

(Continued)

*Primary Examiner* — Syed Ali
(74) *Attorney, Agent, or Firm* — Armis IP Law, LLC

(57) ABSTRACT

A communication management resource receives first input indicating a first time-division communication configuration associated with first wireless stations operated by a first wireless network service provider. The communication management resource receives second input indicating a second time-division communication configuration associated with second wireless stations such as operated by a second wireless network service provider. Based on spectral analysis of implementing the first time-division communication configuration and the second time-division communication configuration, the communication management resource controls implementation of time-division communication configurations by the first wireless stations and the second wireless stations.

27 Claims, 10 Drawing Sheets

(56) References Cited

U.S. PATENT DOCUMENTS

| | | | |
|---|---|---|---|
| 2016/0073431 A1* | 3/2016 | Park | H04W 72/0473 |
| | | | 370/329 |
| 2016/0286409 A1* | 9/2016 | Kravets | H04W 24/02 |
| 2016/0365897 A1* | 12/2016 | Gross | H01P 3/00 |
| 2017/0064515 A1* | 3/2017 | Heikkila | G01S 5/0278 |
| 2019/0044614 A1* | 2/2019 | Khoshnevisan | H04L 5/14 |
| 2019/0150072 A1* | 5/2019 | Barzegar | H02P 29/40 |
| | | | 370/338 |
| 2019/0182665 A1* | 6/2019 | Edge | H04W 74/08 |
| 2019/0326947 A1* | 10/2019 | Kikuzuki | H04B 1/707 |
| 2020/0084778 A1* | 3/2020 | Wang | H04W 72/10 |
| 2021/0092767 A1* | 3/2021 | Jones | H04W 48/16 |

\* cited by examiner

| | SERVICE PROVIDER 1 GAIN IN UL/DL | SERVICE PROVIDER 2 LOSS IN UL | SERVICE PROVIDER 2 LOSS IN DL | OVERALL NET GAIN (BWnet) | SELECTED TDD CONFIGN. FOR SP#1 AND SP#2 |
|---|---|---|---|---|---|
| FROM FIG. 5 | 750 | 495 | 0 | 255 | BW = 20MHz, Ra = 24%<br>S.P. 1 = TDD CONFIGN 2<br>S.P. 2 = TDD CONFIGN 2 |
| FROM FIG. 6 | 1500 | 580 | 0 | 920 | BW = 30MHz, Ra = 24%<br>S.P. 1 = TDD CONFIGN 2<br>S.P. 2 = TDD CONFIGN 2 |
| FROM FIG. 7 | 750 | 905 | 0 | -155 | BW = 25MHz<br>S.P. 1 = TDD CONFIGN 2 (Ra = 24%)<br>S.P. 2 = TDD CONFIGN 1 (Rb = 65%) |

TABLE 810

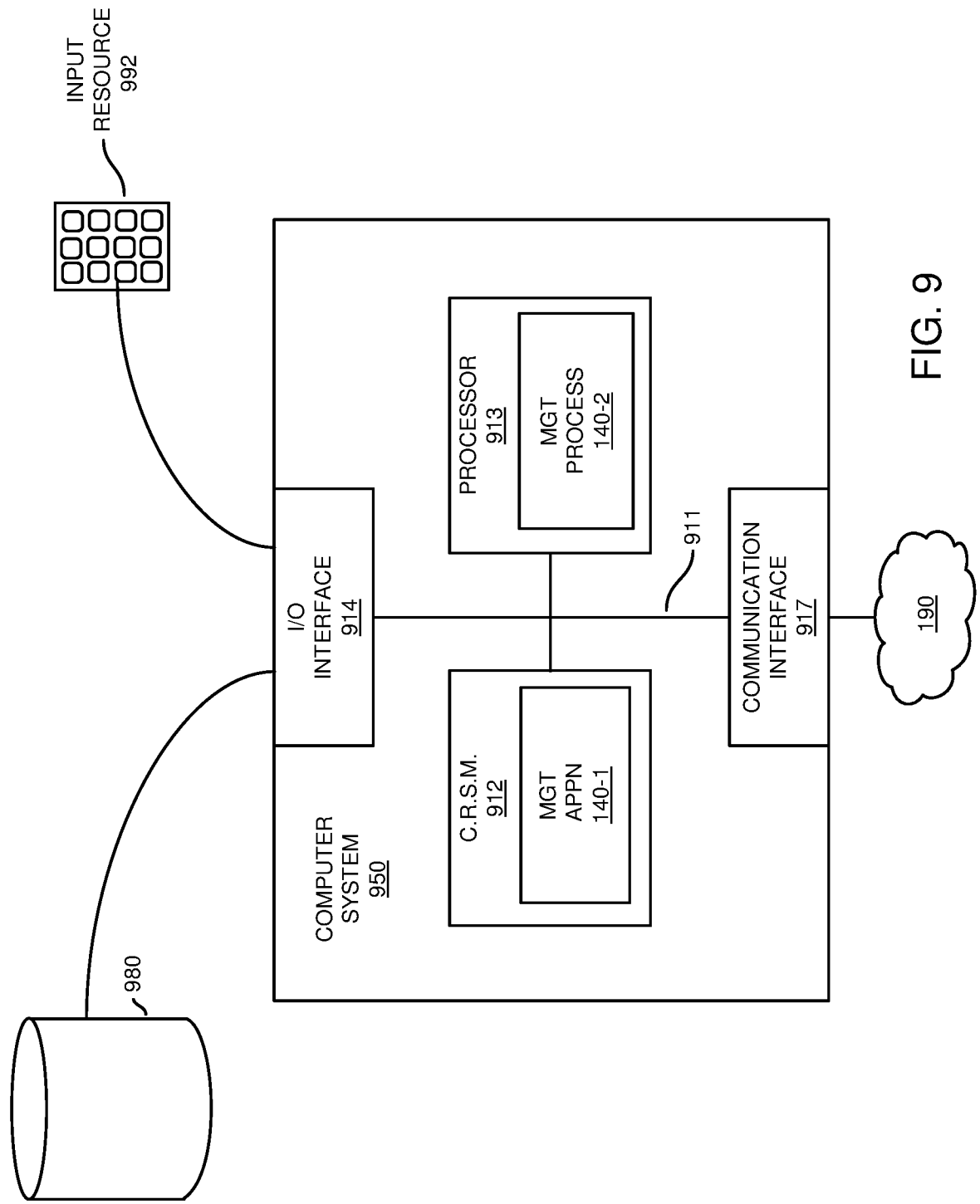

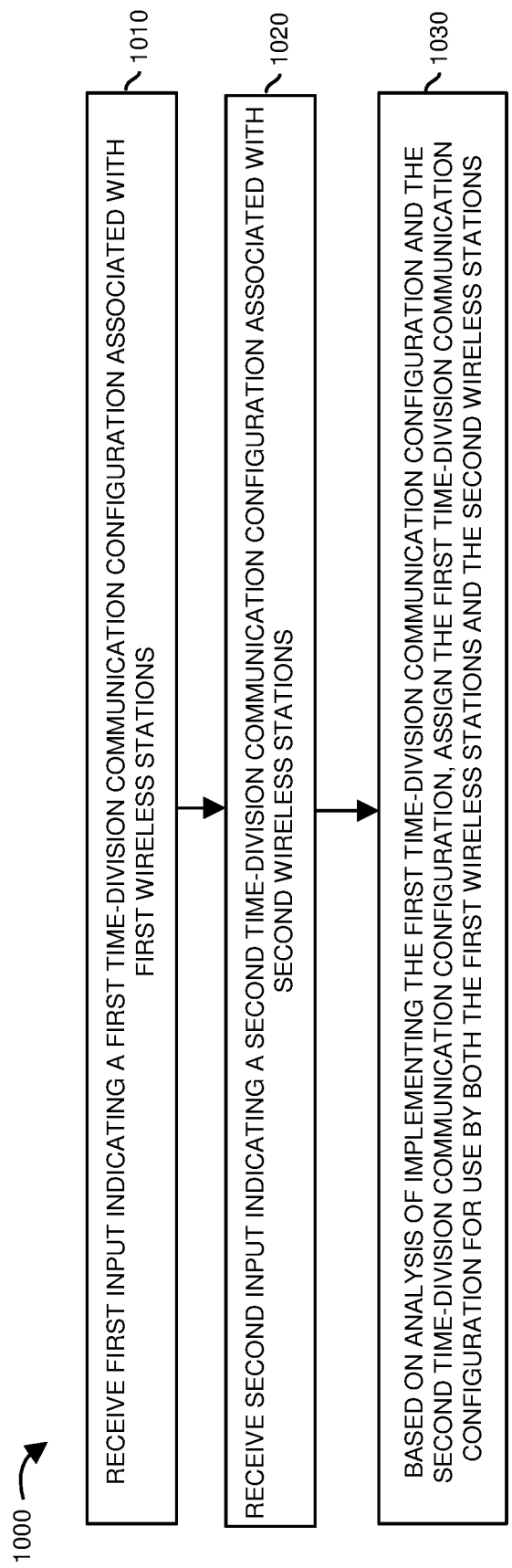

TIME-DIVISION COMMUNICATION ANALYSIS AND BANDWIDTH ALLOCATION IN A WIRELESS NETWORK

RELATED APPLICATION

This application claims the benefit of earlier filed U.S. Provisional Patent Application Ser. No. 63/037,420 entitled "TIME-DIVISION COMMUNICATION ANALYSIS AND BANDWIDTH ALLOCATION IN A WIRELESS NETWORK," filed on Jun. 10, 2020, the entire teachings of which are incorporated herein by this reference.

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a device uses a wireless channel allocated from a CBRS (Citizens Band Radio Service) band to support communications with one or more mobile communication devices.

In general, the Citizens Broadband Radio Service (CBRS) band is shared among three tiers of users (incumbent users, priority access license users, and general authorized users) in which the higher tiers are protected from interference from the lower tiers. For example, incumbents are entities such as U.S. military and grandfather fixed satellite service users. Priority access license (PAL) users are entities such as operators who purchase spectrum licenses. General authorized access (GAA) users are allocated channels in the CBRS band without a license when bandwidth is available.

Typically, a so-called SAS (Spectrum Access Service) in a CBRS network allocates one or more wireless channels to a CBSD (such as a wireless base station) to support communications with respective user equipment such as one or more mobile communication devices. Each wireless station can be configured to communicate with the SAS to receive notification of the one or more wireless channels allocated for its use. Controlled allocation of wireless channels by the spectrum access system helps to prevent interference and increase spectrum use amongst the wireless stations sharing the spectrum.

In general, interference in the CBRS spectrum is managed among users such that: i) PAL users are protected from each other and GAA users, ii) and GAA users are not protected but a coexistence manager (CxM) manages interference among them. Interference protection and management is done to avoid co-channel interference (CCI). Co-channel interference refers to interference caused by a wireless station of one user to a user equipment of another user (or vice versa), while both using the same carrier frequency. Adjacent-channel interference (ACI) is caused by a wireless station of one user to a user equipment of another user (or vice versa), when using carrier frequencies that are adjacent to each other. These two types of interference are present in frequency division duplex (FDD) bands.

Co-channel and adjacent channel interference also occur in time division duplex (TDD) bands when networks are time synchronized and using the same uplink-downlink TDD configuration, i.e. their uplink and downlink sub-frames or slots occur synchronously. For example, all wireless stations can be configured to implement a TDD configuration supporting 20% uplink sub-frames and 80% downlink sub-frames. In certain instances, wireless network service providers may elect to implement different TDD configurations or their networks may not be synchronized. For example, a first wireless network service provider may operate first wireless stations using a first time-division duplex configuration of 30% uplink and 70% downlink. A second wireless network service provider may operate second wireless stations using a second time-division duplex configuration of 60% uplink and 40% downlink. In such scenarios, the wireless station of one network (using downlink sub-frames) may interfere with the wireless station of another network (using uplink sub-frames). Alternatively, the user equipment of one network (using uplink sub-frames) may interfere with the user equipment of another network (using downlink sub-frames). This is known as cross-link interference (CLI) which occurs in both co-channel and adjacent channel frequencies. CLI may significantly impact coexistence among operators sharing a TDD band.

BRIEF DESCRIPTION OF EMBODIMENTS

There are deficiencies associated with conventional techniques of allocating use of wireless channels in a network environment. For example, each wireless network service provider typically desires to implement a specific time-division duplex configuration. In such an instance, wireless stations are susceptible to cross-link interference because they operate in different time-division duplex modes or they are not synchronized.

This disclosure includes the observation that it is sometimes desirable to coordinate use of time-division duplex configurations implemented in a respective wireless network environment. That is, it may be desirable that one or more wireless stations in a network environment synchronize frames and operate in an uplink mode at the same time and operate in a downlink mode at the same time. This reduces effects of co-channel interference and provides more efficient and fair use of the available wireless spectrum.

Achieving frame synchronization may be problematic, e.g. based on 3GPP requirements in some environments (e.g. indoor). Additionally, only two TDD configurations have been standardized which do not cover all use cases, e.g. under heavy uplink use. In general, forcing the same TDD configuration has been considered to be too restrictive.

PAL users may elect to opt out of common TDD configuration causing interference. CBRS users that are not members of CBRS Alliance are not governed by the rules and therefore may cause and suffer from significant interference. Yet further, adjacent channel coexistence methods can be used for spectrum partitioning to avoid adjacent channel interference impact when users employ different TDD configurations. However, this may result in less spectrum for all users as guard bands may be needed.

Embodiments herein provide novel ways of providing improved allocation and use of wireless channels amongst different entities sharing use of spectrum in a wireless network environment.

More specifically, according to one example embodiment, a communication management resource receives first input indicating a first time-division communication configuration associated with first wireless stations such as operated by a first wireless network service provider. The communication management resource receives second input indicating a second time-division communication configuration associated with second wireless stations such as operated by a second wireless network service provider. Based on spectral analysis of implementing the first time-division communication configuration and the second time-division communication configuration, and analysis of overall net bandwidth gains/losses associated with implementing one or more time-division duplex configurations, the communication management resource controls (such as selecting and assigning) implementation of time-division duplex configurations by the first wireless stations and the second wireless stations. Assignment may include selecting and assigning sufficient wireless spectrum to ensure that the corresponding wireless stations are able to communicate with other wireless stations.

In one embodiment, the communication management resource assigns the first time-division communication configuration for use by both the first wireless stations and the second wireless stations in response to detecting that implementation of the first time-division communication configuration provides an overall net bandwidth gain amongst the first wireless stations and the second wireless stations. In one embodiment, the net bandwidth gain occurs when the bandwidth gain to the first wireless stations is greater than a bandwidth loss to the second wireless stations.

As previously discussed, in one embodiment, the first wireless stations are operated by a first wireless network service provider; the second wireless stations are operated by a second wireless network service provider. The first wireless stations and the second wireless stations operated in a same assigned wireless frequency band and are therefore susceptible to cross-link interference. Implementation of a common time-division duplex configuration and corresponding synchronization by both the first wireless stations and the second wireless stations is desirable because it reduces interference amongst the wireless stations.

In one embodiment, as previously discussed, the communication management resource can be configured to allocate any suitable amount of bandwidth to operate both the first wireless stations and the second wireless stations using the first time-division communication configuration.

Further embodiments herein include, via the communication management resource, and based on the spectral analysis, detecting that assignment of the first time-division communication configuration for use by both the first wireless network service provider and the second wireless network service provider provides more efficient use of wireless bandwidth shared by the first wireless stations and the second wireless stations.

In still further example embodiments, the first time-division communication configuration indicates a first uplink/downlink communication ratio requested by the first wireless network service provider operating the first wireless stations; the second time-division communication configuration indicates a second uplink/downlink communication ratio requested by a second wireless network service provider operating the second wireless stations. In one embodiment, the mismatch in the ratios prompts the communication management resource to determine whether implementation of both the first wireless stations and the second wireless stations using a common time-division duplex configuration is desirable.

As previously discussed, in one example embodiment, the first time-division communication configuration indicates a first uplink/downlink communication ratio associated with the first wireless stations; and the second time-division communication configuration indicates a second uplink/downlink communication ratio associated with the second wireless stations. Because the first wireless network service provider and the second wireless network service provider request operation of respective wireless stations using different time-division communication configurations, the communication management resource performs an analysis of operating all wireless stations (first wireless stations and the second wireless stations) using the same time-division communication configuration or operating the wireless stations based on the originally requested time-division communication configuration by each of the service providers (i.e., operating first wireless stations using the first time-division communication configuration and operating the second wireless stations using the second time-division communication configuration).

In one embodiment, as a result of the analysis, the communication management resource selects the from the first selectable option and the second selectable option depending on a bandwidth gain by the first wireless stations with respect to a bandwidth loss by the second wireless stations.

In still further example embodiments, the analysis of the first time-division communication configuration and the second time-division communication configuration includes: generating a net bandwidth gain value, BWnet, for a first selectable configuration option over a second configuration option, where:

$$BWnet=[BW1-BW2]*Ma+[BW2*Rb-\min(BW2*Rb, BW1*Ra)+BW2*(1-Rb)-\min(BW2*(1-Rb), BW1*(1-Ra))],$$

where BW1 represents a first bandwidth, the first bandwidth associated with the first selectable time-division duplex configuration option;

where BW2 represents a second bandwidth, the second bandwidth associated with a second selectable time-division duplex configuration option;

where Ra represents a percentage of the first time-division communication configuration dedicated to uplink communications;

where Rb represents a percentage of the second time-division communication configuration dedicated to uplink communications;

where Ma represents a number of the first wireless stations;

where Mb represents a number of the second wireless stations;

where min (BW2*Rb, BW1*Ra) is a lesser of BW2*Rb and BW1*Ra; and where min (BW2*(1-Rb), BW1*(1-Ra)) is a lesser of BW2*(1-Rb) and BW1*(1-Ra).

Still further embodiments herein include, via the communication management resource or other suitable entity, providing a notification of the selected time-division communication configuration assigned for use by first wireless stations associated with the first wireless network service provider and second wireless stations associated with the second wireless network service provider.

As previously discussed, the wireless stations can be operated in a wireless network environment supporting wireless communications using channels (bandwidth) allocated from the CBRS (Citizens Broadband Radio Service) spectrum. In such an instance, embodiments herein include allocating common bandwidth (one or more channels) for use by the first wireless stations and the second wireless stations, the common bandwidth allocated from a CBRS (Citizens Broadband Radio Service) spectrum.

These and further embodiment are discussed below in more detail.

Note that any of the resources as discussed herein can include one or more computerized devices, wireless stations, communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: receive first input indicating a first time-division communication configuration associated with first wireless stations; receive second input indicating a second time-division communication configuration associated with second wireless stations; and based on spectral analysis of implementing the first time-division communication configuration and the second time-division communication configuration, control implementation of time-division duplex configurations by the first wireless stations and the second wireless stations.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of allocating portions of an available wireless spectrum in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 8 is an example diagram illustrating results of analyzing implementation of multiple different time-division duplex configurations at different bandwidths according to embodiments herein.

FIG. 9 is a diagram illustrating example computer architecture to execute one or more operations according to embodiments herein.

FIG. 10 is an example diagram illustrating a method according to embodiments herein.

Figure 1:
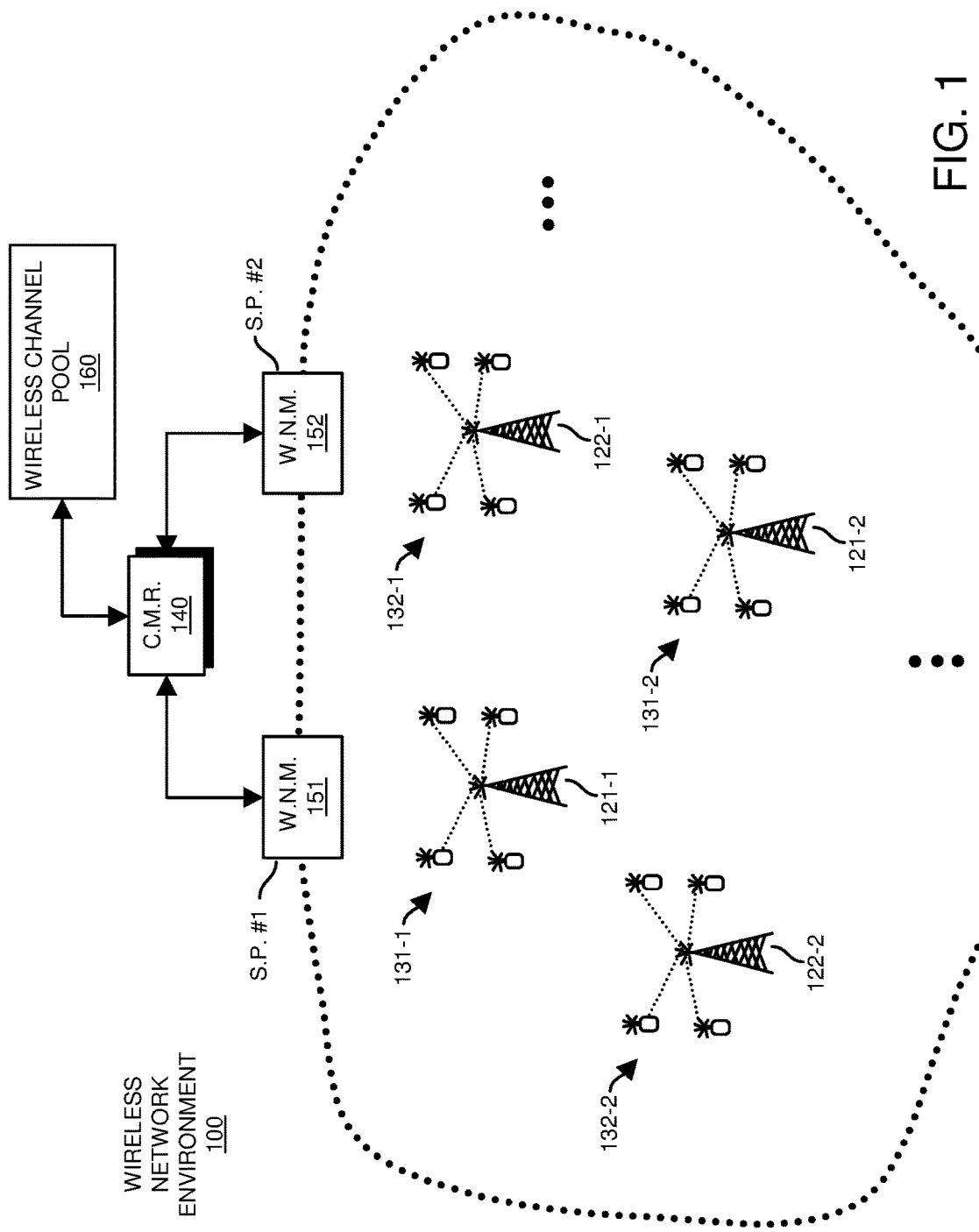
FIG. 1 is an example diagram illustrating implementation of multiple wireless devices by multiple service providers according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a communication management resource. The communication management resource receives first input indicating a first time-division communication configuration associated with first wireless stations operated by a first wireless network service provider. The communication management resource receives second input indicating a second time-division communication configuration associated with second wireless stations such as operated by a second wireless network service provider. Based on spectral analysis of implementing the first time-division communication configuration and the second time-division communication configuration, the communication management resource controls implementation of time-division duplex configurations by the first wireless stations and the second wireless stations.

In one embodiment, the communication management resource assigns the first time-division communication configuration for use by both the first wireless stations and the second wireless stations in response to detecting that implementation of the first time-division communication configuration along with appropriate bandwidth provides an overall net bandwidth gain amongst the first wireless stations and the second wireless stations. In yet further embodiments, the communication management resource selects a time-division duplex configuration for implementation by the first service provider and the second service provider; the selected time-division duplex configuration is a compromise between the first time-division duplex configuration (requested by the first service provider) and the second time-division duplex configuration (requested by the second service provider).

Now, more specifically, FIG. 1 is an example diagram illustrating implementation of multiple wireless devices by multiple service providers according to embodiments herein.

As shown in this example embodiment, network environment 100 includes a geographical region in which multiple wireless stations (such as wireless base stations, mobile communication devices, etc.) reside.

In one embodiment, wireless service provider #1 operates wireless base stations 121 (such as wireless base station 121-1, wireless base station 121-2, etc.) in wireless network environment 100. Each of the wireless base stations 121 operated by the service provider #1 provides wireless connectivity (via any suitable wireless communication protocol such as based on LTE, 5G, etc.) to multiple mobile communication devices. For example, wireless base station 121-1 provides wireless connectivity to mobile communication devices 131-1; wireless base station 121-2 provides wireless connectivity to mobile communication devices 131-2; etc. Via the provided wireless connectivity, the mobile communication devices 131 (operated by respective end users) are able to access a remote network such as the Internet, other mobile communication devices, etc.

Wireless service provider #2 operates wireless base stations 121 (such as wireless base station 122-1, wireless base station 122-2, etc.) in wireless network environment 100. Each of the wireless base stations 122 operated by the service provider #2 provides wireless connectivity to multiple mobile communication devices. For example, wireless base station 122-1 provides wireless connectivity (via any suitable wireless communication protocol such as based on LTE, 5G, etc.) to mobile communication devices 132-1; wireless base station 122-2 provides wireless connectivity to mobile communication devices 132-2; etc. Via the provided wireless connectivity, the mobile communication devices 132 (operated by respective end users) are able to access a remote network such as the Internet, other mobile communication devices, etc.

As further shown in this example embodiment, the wireless network environment 100 includes wireless network manager 151 (associated with service provider #1), wireless network manager 152 (associated with service provider #2), etc.

Wireless network manager 151 can be implemented as a distributed function or at a central location. For example, wireless network manager 151 can be implemented in any suitable wireless station such as wireless base station 121-1, wireless base station 121-2, any of the mobile communication devices 131-1, any of mobile communication devices 131-2, etc. Additionally, or alternatively, wireless network manager 151 associated with service provider #1 can be located at a central location (such as a server resource or other suitable entity).

Wireless network manager 152 can be implemented in a similar manner such as distributed or at a central location. For example, wireless network manager 152 can be implemented in any suitable wireless station such as wireless base station 122-1, wireless base station 122-2, any of the mobile communication devices 132-1, any of mobile communication devices 132-2, etc. Additionally, or alternatively, wireless network manager 152 associated with service provider #2 can be located at a central location.

As further shown, the wireless network environment includes communication management resource 140. In general, the communication management resource 140 manages allocation and use of wireless channels (wireless bandwidth). The wireless bandwidth can be any suitable spectrum supporting wireless communications.

In one non-limiting example embodiment, the communication management resource 140 represents one or more spectrum access systems (a.k.a., SASs). As further discussed herein, the communication management resource 140 supports fair allocation and efficient use of wireless bandwidth (such as wireless channels) from a wireless channel pool 160 of multiple wireless channels. In accordance with further example embodiments, the communication management resource 140 is a spectrum access system that allocates CBRS channels for use by the respective wireless stations.

As previously discussed, the wireless channel pool 160 can include any suitable types of wireless channels. In one embodiment, the wireless channels are CBRS wireless channels as shown and discussed in FIG. 2.

Figure 2:
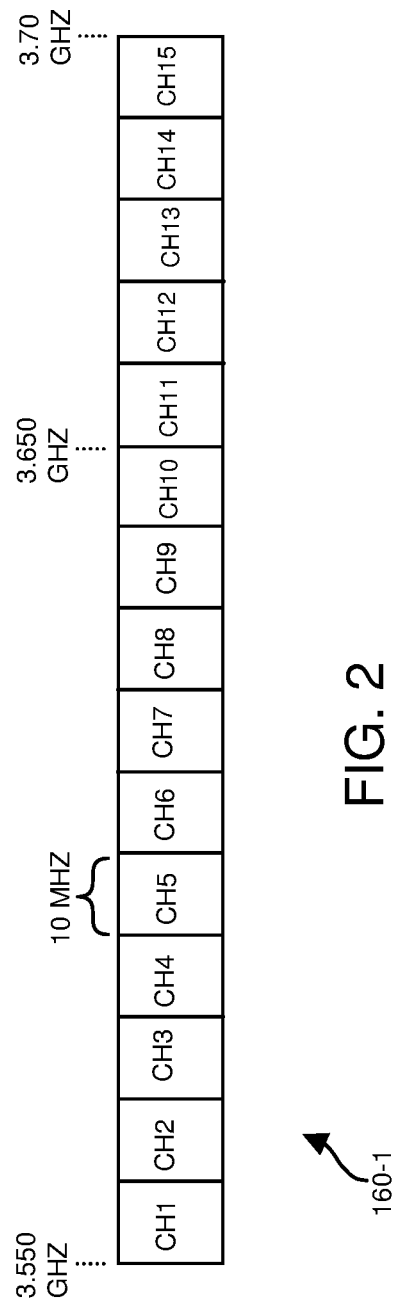
FIG. 2 is an example diagram illustrating availability of a pool of multiple wireless channels in a CBRS band according to embodiments herein.

FIG. 2 is an example diagram illustrating availability of a pool of multiple wireless channels in a CBRS band according to embodiments herein.

As previously discussed, the communication management resource 140 can be configured to allocate any suitable wireless channels from wireless channel pool 160 for use by the wireless stations present in the wireless network environment 100.

In one embodiment, the communication management resources allocate wireless channels from a CBRS band (such as between 3.550 and 3.70 GHz). Although embodiments herein include allocating wireless channels from any suitable wireless spectrum of shared wireless bandwidth.

In this example embodiment, the available wireless channel pool 160 includes channels (such as bandwidth partitions, sub-band portions, sub-band segments, etc.) wireless channels CH1, CH2, CH3, . . . CH15 associated with a CBRS band such as between 3.550 and 3.700 GHz bandwidth. In one embodiment, each channel supports 10 MHz bandwidth, although the available bandwidth can be partitioned into any sized channel. In one embodiment, a portion of the wireless channels includes a guard band.

There are multiple different types of wireless channels in a conventional CBRS band of wireless channels allocated by the communication management resource 140. For example, portions of CBRS band (tiered hierarchy) include Priority Access License (PAL) wireless channels, General Authorized Access (GAA) wireless channels, or a combination of both. Highest priority is given to incumbent users (such as the government, next highest priority is given to (PAL) priority access licensed users. GAA users have the lowest priority.

In general, PAL wireless channels are licensed wireless channels in which a corresponding licensee (such as an entity paying for use of the wireless channel) is provided some protection of use of one or more allocated wireless channels in the CBRS band. For example, when no incumbent user (e.g., Government authority) requires use of the channels, the licensed entities are able to freely use the PAL wireless channels in respective one or more predetermined geographical regions without interference by other users (such as lower priority GAA users). General authorized access (GAA) users are able to use the band without a license when the wireless channels are available.

Subsequent to allocation, the wireless station assigned the one or more wireless channels (or bandwidth) uses the allocated channels to provide one or more communication devices access to a remote network such as the Internet. Any suitable portion of allocated bandwidth can be used as a guard band.

In one non-limiting example embodiment, a portion of spectrum comprising 10 MHz channels are available in areas (such as counties) in the 3550-3650 MHz frequency range in the CBRS band. The spectrum can be partitioned in a similar manner.

Up to 7 licenses will be awarded in each county. Each entity can buy rights for up to 4 licenses. The exact frequency range associated with a respective license is not guaranteed because it can change due to incumbent activity. In certain instances, a spectrum access system (SAS) will determine a primary and a secondary channel allocation for so-called PAL users.

Embodiments herein include the observation that, in certain instances, it is desirable to operate multiple wireless stations using a common time-division duplex configuration.

Figure 3:
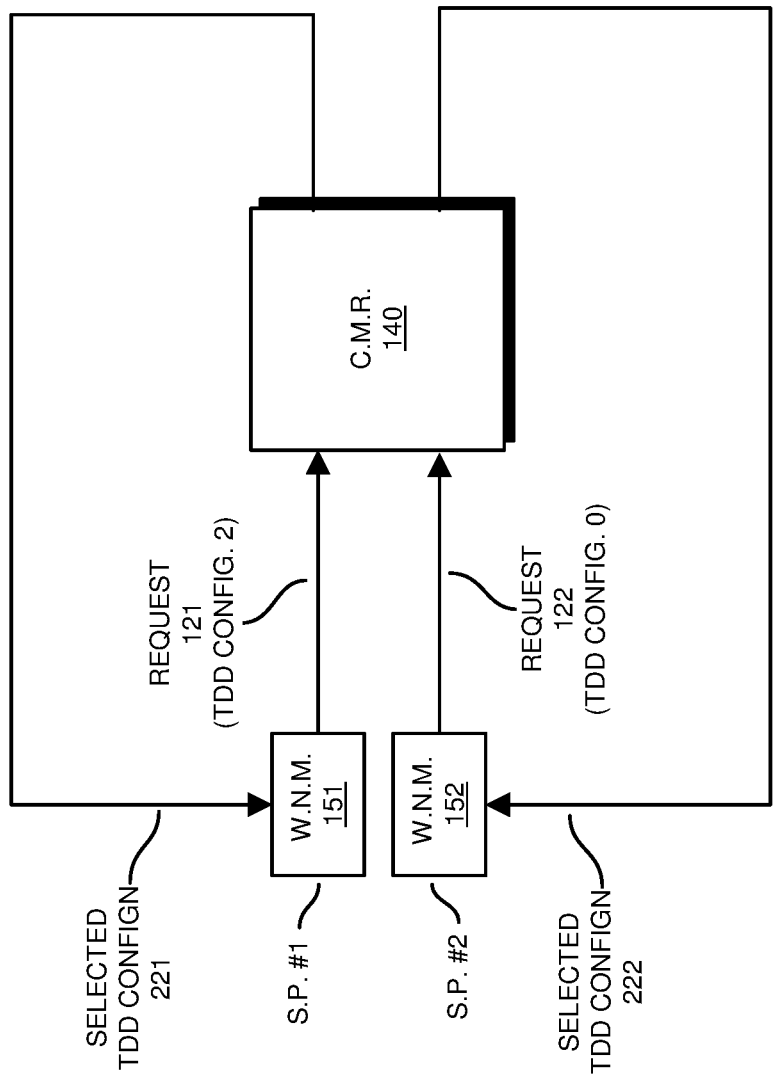
FIG. 3 is an example diagram illustrating assignment of one or more time-division duplex configurations to wireless devices according to embodiments herein.

FIG. 3 is an example diagram illustrating assignment of one or more time-division duplex configurations to wireless devices according to embodiments herein.

More specifically, according to one example embodiment, the communication management resource 140 receives first input (such as a first request 121) indicating a first time-division communication configuration (such as time-division duplex configuration 2 specifying a ratio of 24% uplink communications to 76% downlink communications) associated with the first wireless stations (wireless base stations 121, mobile communication devices 131) such as operated by a first wireless network service provider (service provider #1).

The communication management resource 140 also receives second input (such as a second request 122) indicating a second time-division communication configuration (such as time-division duplex configuration 0 specifying 65% uplink communications to 35% downlink communications) associated with second wireless stations (wireless base stations 122 and mobile communication devices 132) such as operated by the second wireless network service provider (service provider #2).

In accordance with further example embodiments, the communication management resource 140 is configured to analyze different time-division duplex configuration options and select the best one or more configuration options to implement in network environment 100 simultaneous use amongst the multiple service providers.

As further discussed herein, in one embodiment, based on analysis of implementing the first time-division communication configuration and the second time-division communication configuration such as implemented via different allocated bandwidths, the communication management resource 140 selects and assigns the first time-division communication configuration (requested by the first service provider via wireless network manager 151) for use by both the first wireless stations and the second wireless stations. Alternatively, if the first time-division duplex configuration is not suitable for use by both the first service provider and second service provider, the communication management resource 140 notifies the first service provider (service provider #1) to implement the time-division duplex configuration 2 and notifies the second service provider (service provider #2) to implement the time-division duplex configuration 0 as further discussed herein.

In yet further embodiments, if deemed suitable, the communication management resource 140 can be configured to select a third time-division duplex configuration (different than the first requested time-division duplex configuration and the second requested time-division duplex configuration) for implementation by the service provider #1 and the service provider #2. The selected time-division duplex configuration can have an assigned uplink/downlink ratio that is between the uplink/downlink value of the first time-division duplex configuration and the second time-division duplex configuration. For example, if the uplink setting of the first time-division duplex configuration is 24% and the uplink value for the second time-division duplex configuration is 65%, the uplink value of the selected third time-division duplex configuration can be a value between 24% and 65%.

As further discussed herein, in one embodiment, the communication management resource 140 assigns the first time-division communication configuration (such as time-division duplex configuration 2 because the service provider #2 has a greater number of associated wireless stations) for use by both the first wireless stations associated with service provider #1 and the second wireless stations associated with service provider #2 in response to detecting that implementation of the first time-division communication configuration (time-division duplex configuration 2) along with appropriate bandwidth provides an overall net bandwidth gain amongst the first wireless stations and the second wireless stations.

More specifically, as further discussed below, embodiments herein include analyzing net bandwidth gain and losses associated with operating in each of the different time-division duplex configuration modes and then selecting one or more time-division duplex configurations based on such analysis. As shown in FIG. 3, the communication management resource 140 notifies the wireless network manager 151 of a selected time-division duplex configuration 221; the communication management resource 140 notifies the wireless network manager 151 of a selected time-division duplex configuration 222.

Figure 4:
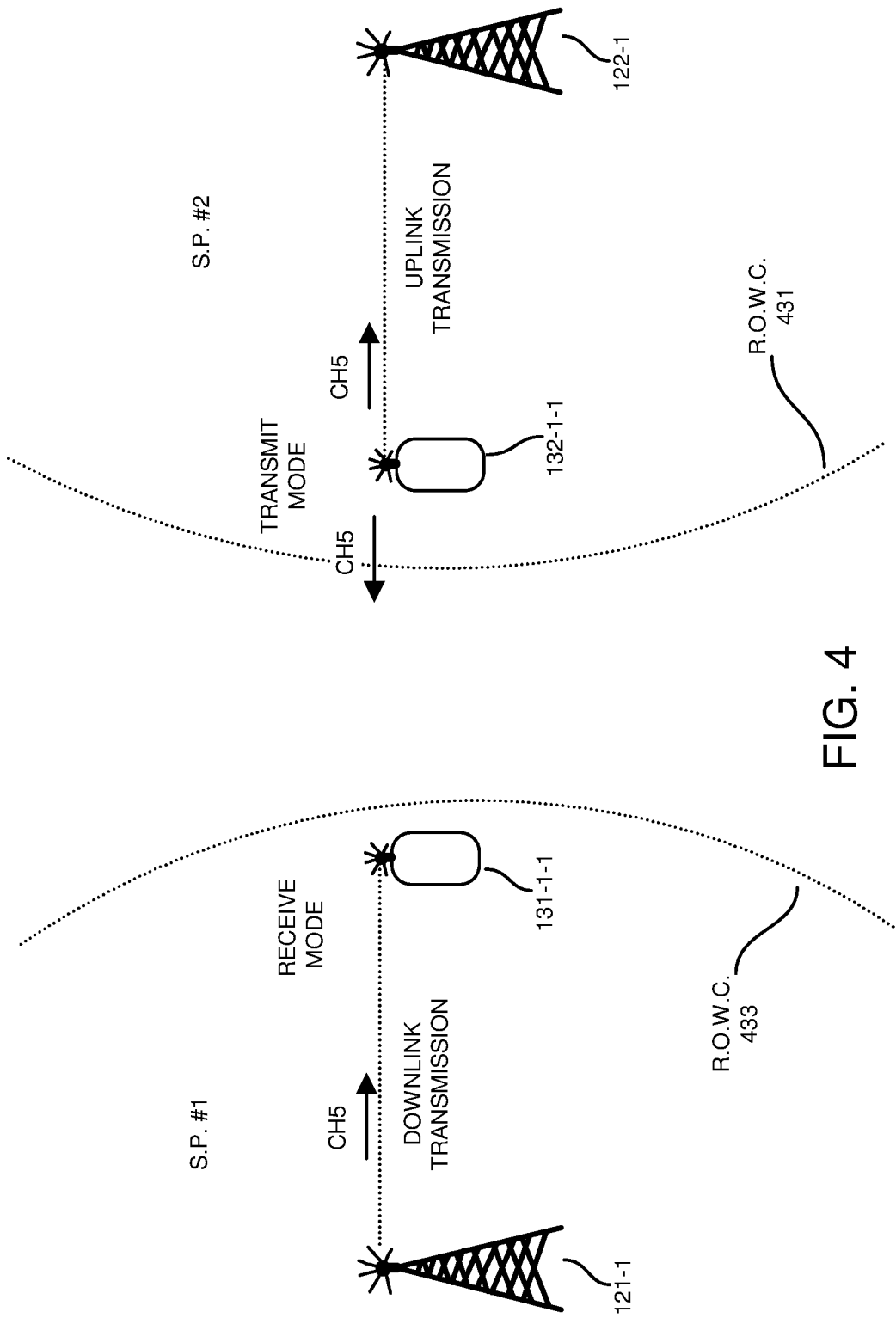
FIG. 4 is an example diagram illustrating co-channel interference according to embodiments herein.

FIG. 4 is an example diagram illustrating co-channel interference according to embodiments herein.

In this example embodiment, assume that the service provider #1 implements a different time-division duplex configuration than service provider #2. In such an instance, for durations of time in which the wireless base station 121-1 and mobile communication device 131-1-1 operate in a downlink mode while wireless base station 122-1 and mobile communication device 132-1-1 operate in an uplink mode, the mobile communication device 131-1-1 experiences a high amount of co-channel interference from mobile communication device 132-1-1.

More specifically, assume that the wireless base station 121-1 communicates in the downlink direction over channel 5 to the mobile communication device 131-1-1 while mobile communication device 132-1-1 communicates in the uplink over wireless channel 5 to the wireless base station 122-1. Because the mobile communication device 131-1-1 and mobile communication device 132-1-1 are in close proximity, the uplink communications on wireless channel 5 interfere with the mobile communication device 131-1-1 receiving downlink communications from the wireless base station 121-1. This high amount of wireless interference is undesirable and results in a poor use of available wireless bandwidth (channels).

As previously discussed, one embodiment herein includes potentially implementing a common time-division duplex (TDD) configuration and frame synchronization by wireless stations in wireless network environment 100 to provide more efficient use of available wireless bandwidth.

Figure 5:
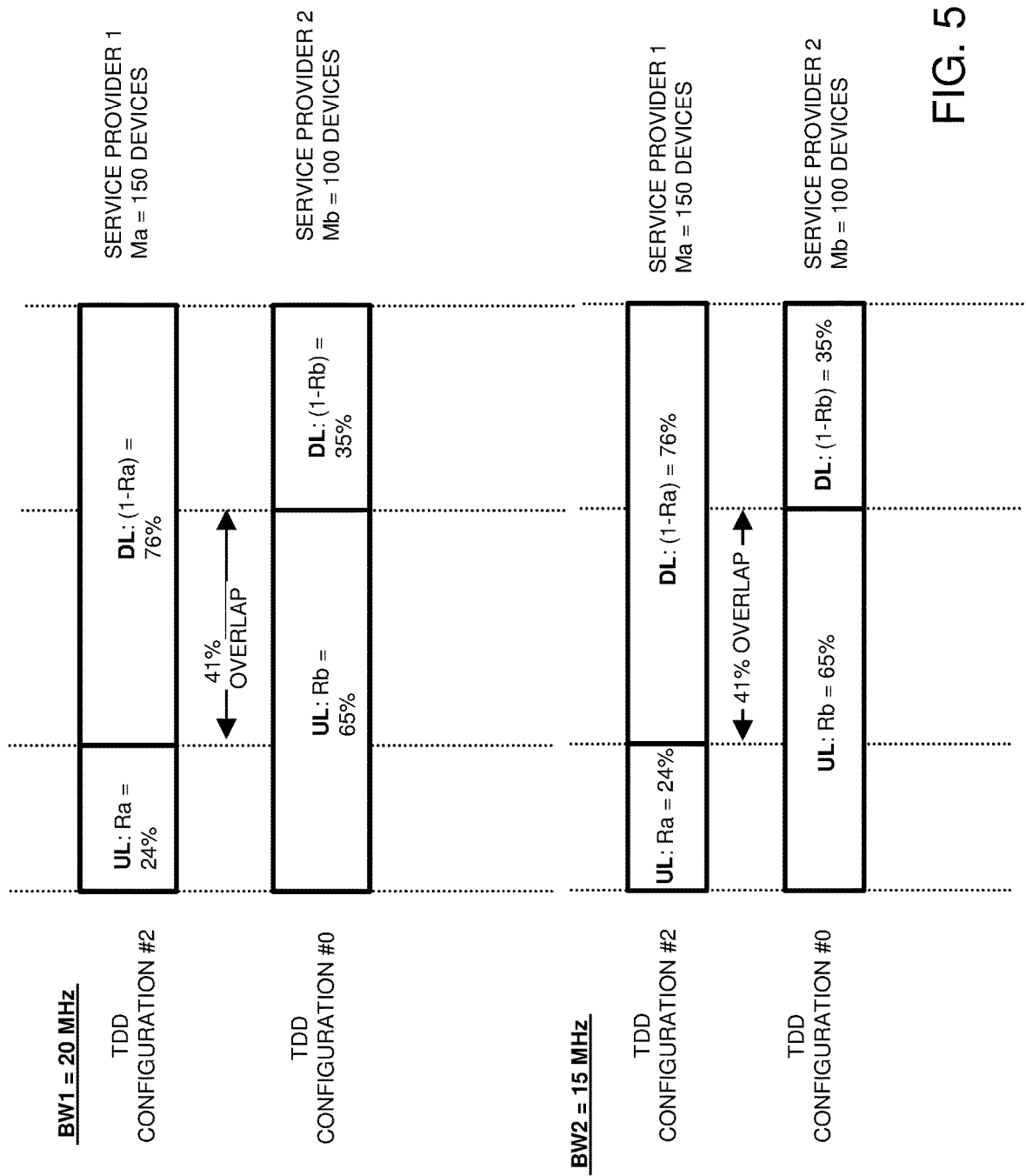
FIG. 5 is an example diagram illustrating time-division duplex configurations requested by multiple service providers and analysis of same at different bandwidths according to embodiments herein.

FIG. 5 is an example diagram illustrating time-division duplex configurations requested by multiple service providers and analysis of same at different bandwidths according to embodiments herein.

Embodiments herein include, via the communication management resource 140, comparing various TDD configuration options and selecting the one or more time-division duplex configuration option that provides the most overall spectrum for the wireless stations (such as CBSDs) associated with all service providers (users).

In this example embodiment, suppose that there are two service providers such as service provider #1 and service provider #2 in a connected set of wireless stations (wireless stations experiencing co-channel interference) operating in a same geographical region of wireless network environment 100. Assume further that the service providers desire TDD configurations with UL (a.k.a., Uplink) fraction Ra (i.e., an uplink percentage associated with wireless stations of service provider #1 for time-division duplex configuration option 2) and Rb (i.e., uplink percentage associated with wireless stations of service provider #2 for time-division duplex configuration option 0).

Value Ma represents the number of wireless stations associated with the service provider #1; value Mb represents the number of wireless stations associated with the service provider #2.

Suppose that Ma>Mb. In such an instance, the majority TDD configuration 2 with UL fraction Ra is set as a possible selectable first or default TDD configuration for both service providers.

Embodiments herein include comparing the two TDD configuration options below to determine which of multiple time-division duplex options is best to implement in the wireless network environment 100 or whether each service provider should use their respective requested time-division duplex configuration.

Time-division duplex Option 1 (default): Both service providers use the same default TDD configuration (time-division duplex configuration 2 in this example embodiment). Let BW1 as the bandwidth allocated to each service provider in this option.

Time-division duplex Option 2: Each service provider uses its desired TDD configuration. Let BW2 be the bandwidth allocated to each service provider in this option.

In one embodiment, the bandwidth BW2 may be less than or equal to BW1 as a portion of such bandwidth may be used as a guard band to allow different TDD configurations. Therefore, service provider #2 may get more overall bandwidth BW1 in Option 1.

However, note that the bandwidth for a given direction (UL or DL) may be less than desired for service provider #2. For example, the UL bandwidth BW1*Ra in Option 1 may be less than UL bandwidth BW2*Rb in Option 2, or DL bandwidth BW1*[(1−Ra)] may be less than DL bandwidth BW2*[(1−Rb)].

One embodiment herein includes making the fundamental assumption that the spectrum loss in one direction is not compensated by the gain in the other direction. In other words, if a service provider gains bandwidth in either uplink or downlink direction that is not desired, then that unwanted gain is not counted in the equation for service provider #2.

Thus, in one embodiment, the potential UL spectrum loss incurred by service provider #2 in Option 1 is given by [BW2*Rb−min (BW2*Rb, BW1*Ra)].

Similarly, the potential DL spectrum loss incurred by service provider #2 in Option 1 is given by [BW2*(1−Rb)− min (BW2*(1−Rb), BW1*(1−Ra))], The spectrum gain in both (UL, DL) directions observed by service provider #1 in Option 1 is BW1−BW2.

The net effect in using Option 1 over Option 2 after accounting for the number of CBSDs of both service providers is as follows:

$$BWnet=[BW1-BW2]*Ma+[BW2*Rb-\min(BW2*Rb, BW1*Ra)+BW2*(1-Rb)-\min(BW2*(1-Rb), BW1*(1-Ra))], \quad \text{equation \#1}$$

where BW1 represents a first bandwidth, the first bandwidth associated with both service providers implementing the same first time-division duplex configuration option;

where BW2 represents a second bandwidth, the second bandwidth associated with a second selectable option of each service provider using their requested time-division duplex configuration;

where Ra represents a percentage of the first time-division communication configuration 2 dedicated to support uplink communications;

where Rb represents a percentage of the second time-division communication configuration 0 dedicated to uplink communications;

where 1−Ra represents a percentage of the first time-division communication configuration 2 dedicated to support downlink communications;

where 1−Rb represents a percentage of the second time-division communication configuration 0 dedicated to downlink communications;

where min (BW2*Rb, BW1*Ra) is a lesser of BW2*Rb and BW1*Ra; and where min (BW2*(1−Rb), BW1*(1−Ra)) is a lesser of BW2*(1−Rb) and BW1*(1−Ra).

The above equation #1 represents the net bandwidth gain for Option 1. As further discussed below, option 2 is selected if the net gain associated with equation #1 is negative or less than zero or some other threshold value.

Example #1

Assume in this example embodiment that service provider requests time-division duplex configuration 2 in which (Ra=24% UL, resulting in 76% DL), and the number of wireless stations associated with service provider #1 implementing the requested time-division duplex configuration 2 in wireless network environment 100 is Ma=150 wireless stations.

Assume further in this example embodiment that service provider #2 requests time-division duplex configuration 0 in which (Rb=65% UL, resulting in 35% DL) and the number of wireless stations associated with service provider #2 implementing the requested time-division duplex configuration 0 in wireless network environment 100 is Ma=100 wireless stations.

Let BW1=20 MHz and BW2=15 MHz. In such an instance, the net bandwidth is determined as follows:

$$BWnet=5*150-[15*0.65-\min(15*0.65,20*0.24)+15*0.35-\min(15*0.35,20*0.76)]*100=750-495=255$$

In such an instance, because the result of the net bandwidth (255) is a positive and/or greater than 0, the communication management resource 140 selects the time-division duplex configuration 2 for implementation by both service providers #1 and #2 and all 250 wireless stations (150 wireless stations of service provider #1 and 100 wireless stations of service provider #2).

The communication management resource 140 also assigns use of 20 MHz of wireless bandwidth for shared use by the service providers (some of the wireless bandwidth may be used as a guard band). The communication management resource 140 communicates (such as via communications 221 and 222 as previously discussed in FIG. 3) the assigned 30 MHz of wireless channel bandwidth as well as notification of the selected time-division duplex configuration 2 to the service provider #1 and service provider #2. Both service providers service provider #1 and service provider #2 implement the time-division duplex configuration 2 (Ra=24%) using the assigned 20 MHz.

Figure 6:
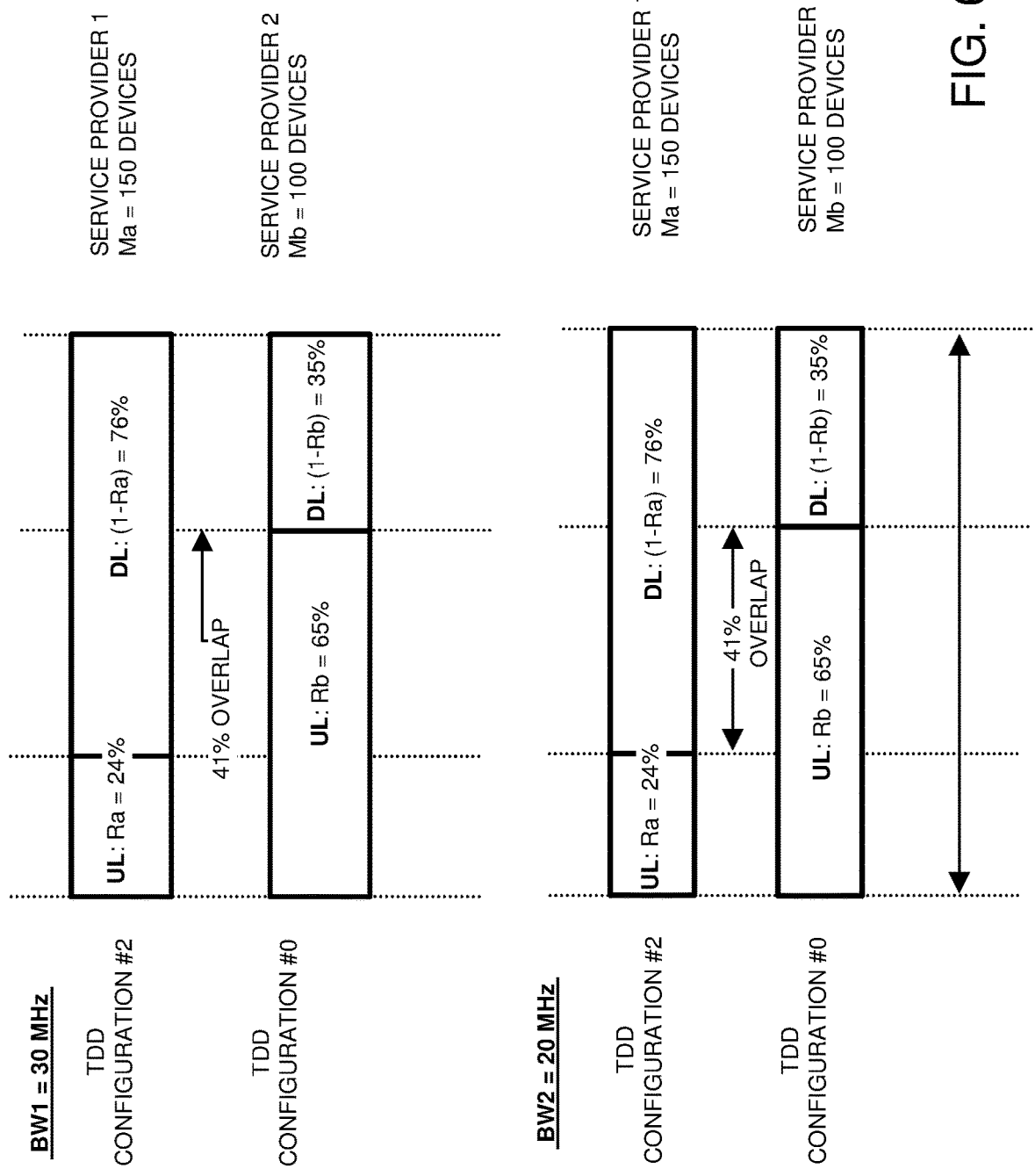
FIG. 6 is an example diagram illustrating time-division duplex configurations requested by multiple service providers and analysis of same at different bandwidths according to embodiments herein.

FIG. 6 is an example diagram illustrating time-division duplex configurations requested by multiple service providers and analysis of same at different bandwidths according to embodiments herein.

Example #2

In a similar manner as previously discussed, assume in this example embodiment that service provider requests time-division duplex configuration 2 in which (Ra=24% UL, resulting in 76% DL), and the number of wireless stations associated with service provider #1 implementing the requested time-division duplex configuration 2 in wireless network environment 100 is Ma=150 wireless stations.

Assume further in this example embodiment that service provider #2 requests time-division duplex configuration 0 in which (Rb=65% UL, resulting in 35% DL) and the number of wireless stations associated with service provider #2 implementing the requested time-division duplex configuration 0 in wireless network environment 100 is Ma=100 wireless stations.

Let BW1=30 MHz and BW2=20 MHz. In such an instance, the net bandwidth is determined as follows:

$$BWnet=10*150-[20*0.65-\min(20*0.65,30*0.24)+20*0.35-\min(20*0.35,30*0.76)]*100=1500-580=920$$

In such an instance, because the result of the net bandwidth (920) is positive and/or greater than a threshold value such as 0, the communication management resource 140 selects the time-division duplex configuration 2 for implementation by both service providers #1 and #2 and all 250 wireless stations (150 wireless stations of service provider #1 and 100 wireless stations of service provider #2). The communication management resource 140 assigns use of 30 MHz of wireless bandwidth for use (some of which may be used as a guard band). The communication management resource 140 communicates (via communications 221 and 222) the assigned 30 MHz of wireless channels or bandwidth as well as notification of the selected time-division duplex configuration 2 to the service provider #1 and service provider #2. Both service providers #1 and service provider #2 implement the time-division duplex configuration 2 (Ra=24%) using the 30 MHz allocated bandwidth.

Figure 7:
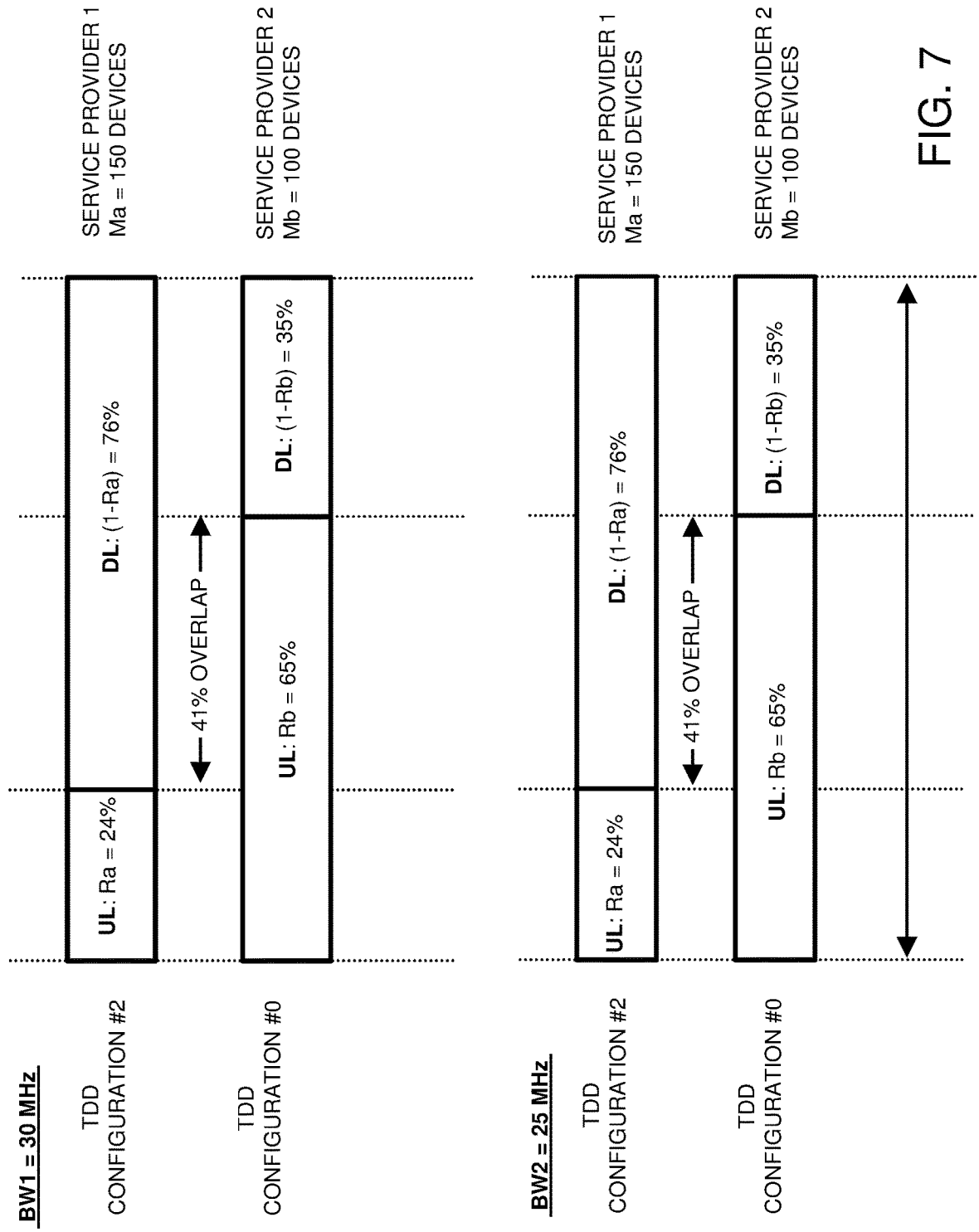
FIG. 7 is an example diagram illustrating time-division duplex configurations requested by multiple service providers and analysis of same at different bandwidths according to embodiments herein.

FIG. 7 is an example diagram illustrating time-division duplex configurations requested by multiple service providers and analysis of same at different bandwidths according to embodiments herein.

Example #3

In a similar manner as previously discussed, assume in this example embodiment that service provider #1 (wireless network manager 151) requests time-division duplex configuration 2 in which (Ra=24% UL, resulting in 76% DL), and the number of wireless stations associated with service provider #1 implementing the requested time-division duplex configuration 2 in wireless network environment 100 is Ma=150 wireless stations.

Assume further in this example embodiment that service provider #2 (wireless network manager 152) requests time-division duplex configuration 0 in which (Rb=65% UL, resulting in 35% DL) and the number of wireless stations associated with service provider #2 implementing the requested time-division duplex configuration 0 in wireless network environment 100 is Ma=100 wireless stations.

Let BW1=30 MHz and BW2=25 MHz. In such an instance, the net bandwidth is determined as follows:

$$BWnet=5*150-[25*0.65-\min(25*0.65,30*0.24)+25*0.35-\min(25*0.35,30*0.76)]*100=750-905=-155$$

In such an instance, because the result of the net bandwidth (−155) is negative and/or less than a threshold value of 0, the communication management resource 140 selects an option in which each of the service providers implements their requested time-division duplex configuration. For example, the service provider #1 implements time-division duplex configuration 2 for use by all of the 150 wireless stations; the service provider #2 implements time-division duplex configuration 0 for use by all of the 100 wireless stations.

The communication management resource 140 assigns use of 25 MHz of wireless bandwidth for use (some of which may be used as a guard band). The communication management resource 140 communicates (via communications 221 and 222) a notification of the assigned 25 MHz of wireless channels or bandwidth as well as notification of the assigned time-division duplex configuration 2 (Ra=24%) to the service provider #1 and assigned time-division duplex configuration 0 (Rb=65%) to service provider #2.

FIG. 8 is an example diagram illustrating results of analyzing implementation of multiple different time-division duplex configurations at different bandwidths according to embodiments herein.

In this example embodiment, table 810 indicates different columns of data associated with the analysis of time-division duplex configurations in FIGS. 5, 6, and 7.

For example, column 811 of table 810 indicates the gain in both uplink and downlink experienced by the service provide #1 when implementing the bandwidth BW1 with respect to (or instead of) bandwidth BW2; column 812 indicates the loss in uplink experienced by the service provider #2 when implementing the bandwidth BW1 with respect to (or instead of) bandwidth BW2; column 813 indicates the loss in downlink experienced by the service provider #2 when implementing the bandwidth BW1 with respect to bandwidth BW2; column 814 indicates the overall network bandwidth gain associated with implementing the bandwidth BW1 and time-division duplex configuration 2 instead of bandwidth BW2 and time-division duplex configuration 0. Column 815 indicates selected time-division duplex configuration settings for service provider #1 and service provider #2 based on the net bandwidth value BWnet.

Further Embodiments

In yet further example embodiments, there are more than two service providers in a connected set. In such an instance, if the number of TDD configurations requested is two, then the users requesting the same TDD configuration are grouped into one default group and the above procedure is as followed. If the number of TDD configurations requested is more than two:

a) The communication management resource 140 groups wireless stations (users) based on respective requested TDD configurations b) The default option is compared pairwise to each other remaining requested time-division duplex configuration option c) The communication management resource 140 selects the best time-division duplex configuration option to implement based on which pair has a minimum BWnet value.

d) The selected option becomes the default option and the process is repeated from operation b onwards until no other option provides a lower BWnet value.

As previously discussed, note again that the method can also be used to compare TDD configurations that are outside of the desired TDD configuration set as a compromise for all users. For example, if desired, a TDD Configuration 1 (such as Ra=50% or other suitable value between 24% and 65% uplink) with an appropriate amount of bandwidth can be considered as an option as a compromise between users' desired Configurations 0 and 2 in the above examples. If desired, the communication management resource 140 can be configured to implement a weight factor depending on the number of wireless stations in each group. For example, for the case as previously discussed, there are 150 wireless stations (communication devices) associated with time-division duplex configuration 2 and 100 wireless stations (communication devices) associated with time-division duplex configuration 0. The communication management resource 140 applies a weight of 150/250 such that the compromise time-division duplex configuration based on the above example is 40.4% uplink and 59.6% downlink for use by both service providers service provider #1 and service provider #2.

In accordance with further example embodiments, embodiments herein are also applicable when GAA spectrum needs to be allocated in addition to PAL spectrum. In this case, each service provider is assumed to require the same TDD configuration for GAA and PAL in a so-called connected set (i.e., a subset of CBSD Interference Graph whose members or their associated end user devices only have potential to cause radio interference to the operation of the other members of the subset or their associated mobile communication devices).

In yet further example embodiments, embodiments herein can be extended to consider CBSD transmit power reductions to improve adjacent channel coexistence. For example, reducing CBSD transmit power in the respective wireless network environment 100 reduces interference. Thus, power control is another dimension of control along with bandwidth allocation.

FIG. 9 is an example block diagram of a computer system for implementing any of the operations as previously discussed according to embodiments herein.

Any of the resources (such as communication management resource 140, wireless network manager 151, wireless network manager 152, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions associated with one or more of communication management resource 140, wireless network manager 151, wireless network manager 152, etc.) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

FIG. 10 is a flowchart 1000 illustrating an example method according to embodiments. Note that there will be some overlap with respect to concepts as discussed above.

In processing operation 1010, the communication management resource 140 receives first input requesting a first time-division communication configuration associated with first wireless stations operated by service provider #1.

In processing operation 1020, the communication management resource 140 receives second input requesting a second time-division communication configuration associated with second wireless stations operated by the service provider #2.

In processing operation 1030, based on spectral analysis of implementing the first time-division communication configuration and the second time-division communication configuration, the communication management resource 140 controls implementation of time-division duplex communication configurations by the first wireless stations and the second wireless stations. Alternatively, the communication management resource 140 notifies the wireless network managers to implement their requested time-division duplex configurations.

Note again that techniques herein are well suited to facilitate fair and desirable assignment of wireless channels and bandwidth for use in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving first input requesting a first time-division communication configuration associated with first wireless stations;
   receiving second input requesting a second time-division communication configuration associated with second wireless stations;
   based on spectral analysis of implementing the first time-division communication configuration and the second time-division communication configuration, controlling implementation of time-division duplex configurations by the first wireless stations and the second wireless stations;
   wherein controlling the implementation of time-division duplex configurations includes: i) calculating an overlap portion in which the first time-division duplex configuration supports uplink wireless communications and the second time-division duplex configuration supports downlink wireless communications, and ii) based at least in part on the calculated overlap portion, determining that simultaneous use of the first time-division duplex configuration by both the first wireless stations and the second wireless stations provides a higher bandwidth efficiency than simultaneous use of the first time-division duplex configuration by the first wireless stations and the second time-division duplex configuration by the second wireless stations; and
   wherein controlling the implementation of time-division duplex configurations includes: selecting the first time-division duplex configuration for use by the first wireless stations and the second wireless stations.

2. The method as in claim 1 further comprising:
   selecting a first option of assigning the first time-division communication configuration for use by both the first wireless stations and the second wireless stations in response to detecting that implementation of the first time-division communication configuration provides an overall net wireless bandwidth gain amongst the first wireless stations and the second wireless stations.

3. The method as in claim 2, wherein the overall net wireless bandwidth gain associated with the first option occurs as a result of wireless bandwidth gain to the first wireless stations being greater than a wireless bandwidth loss to the second wireless stations.

4. The method as in claim 1, wherein the first wireless stations are operated by a first wireless network service provider; and wherein the second wireless stations are operated by a second wireless network service provider, the first wireless stations and the second wireless stations operated in different portions of a wireless frequency band.

5. The method as in claim 1, wherein the first time-division communication configuration indicates a first wireless time-division duplex uplink/downlink configuration associated with the first wireless stations; and wherein the second time-division communication configuration indicates a second wireless time-division duplex uplink/downlink configuration associated with the second wireless stations.

6. The method as in claim 1, wherein the spectral analysis of the first time-division communication configuration and the second time-division communication configuration includes:

generating a net wireless bandwidth gain value, BWnet, for a first selectable configuration option over a second selectable configuration option, where:

$$BWnet=[BW1-BW2]*Ma+[BW2*Rb-\min(BW2*Rb, BW1*Ra)+BW2*(1-Rb)-\min(BW2*(1-Rb), BW1*(1-Ra))],$$

where BW1 represents a first bandwidth, the first bandwidth associated with the first selectable option;

where BW2 represents a second bandwidth, the second bandwidth associated with a second selectable option;

where Ra represents a percentage of the first time-division communication configuration dedicated to uplink communications;

where Rb represents a percentage of the second time-division communication configuration dedicated to uplink communications;

where 1−Ra represents a percentage of the first time-division communication configuration dedicated to downlink communications;

where 1−Rb represents a percentage of the second time-division communication configuration dedicated to downlink communications;

where Ma represents a number of the first wireless stations;

where Mb represents a number of the second wireless stations;

where min (BW2*Rb, BW1*Ra) is a lesser of BW2*Rb and BW1*Ra; and where min (BW2*(1−Rb), BW1*(1−Ra)) is a lesser of BW2*(1−Rb) and BW1*(1−Ra).

7. The method as in claim 1 further comprising:

providing a notification of selected time-division communication configurations assigned for use by first the wireless stations which are associated with a first wireless network service provider and the second wireless stations which are associated with a second wireless network service provider.

8. The method as in claim 7 further comprising:

allocating spectrum for use by the first wireless stations and the second wireless stations, the spectrum allocated from the CBRS (Citizens Broadband Radio Service) band.

9. The method as in claim 1 further comprising:

receiving third input requesting a third time-division communication configuration associated with third wireless stations; and based on a pair-wise spectral analysis of implementing the first time-division communication configuration, the second time-division communication configuration, and the third time-division configuration, selecting a time-division duplex configuration amongst the first time-division communication configuration, the second time-division communication configuration, and the third time-division configuration providing a maximum wireless bandwidth gain.

10. The method as in claim 1, wherein controlling the implementation of time-division duplex configurations includes:

in response to selecting the first time-division duplex configuration: i) providing notification of assignment of the first time-division communication configuration for use by the first wireless stations; and ii) providing notification of assignment of the first time-division communication configuration for use by the second wireless stations.

11. The method as in claim 1, wherein controlling the implementation of time-division duplex configurations includes:

deriving a third time-division duplex configuration from the first time-division duplex configuration and the second time-division duplex configuration, the third time-division duplex configuration being a compromise of uplink/downlink wireless bandwidth between the first time-division duplex configuration and the second time-division duplex configuration.

12. The method as in claim 11, wherein deriving a third time-division duplex configuration includes:

deriving a weight value based on a first number of mobile communication devices supported by the first wireless stations and a second number of mobile communication devices supported by the second wireless stations; and applying the weight value to the first time-division duplex configuration and the second time-division duplex configuration to produce the third time-division duplex configuration.

13. The method as in claim 1, wherein controlling the implementation of time-division duplex configurations includes:

analyzing a first time-division duplex configuration option in which both the first wireless stations and the second wireless stations implement the first time-division duplex configuration using first wireless bandwidth; and analyzing a second time-division duplex configuration option in which the first wireless stations implement the first time-division duplex configuration and the second wireless stations implement the second time-division duplex configuration using second wireless bandwidth, the first wireless bandwidth being greater than the second wireless bandwidth.

14. The method as in claim 13, wherein controlling the implementation of time-division duplex configurations includes:

selecting the second time-division duplex configuration option in response to detecting that a net bandwidth value associated with the first time-division duplex configuration option is a negative value.

15. A method comprising:

receiving first input requesting a first time-division communication configuration associated with first wireless stations;

receiving second input requesting a second time-division communication configuration associated with second wireless stations;

based on spectral analysis of implementing the first time-division communication configuration and the second time-division communication configuration, controlling implementation of time-division duplex configurations by the first wireless stations and the second wireless stations;

via the spectral analysis, detecting that assignment of the first time-division communication configuration for use by both the first wireless network service provider and the second wireless network service provider provides more efficient use of wireless bandwidth shared by the first wireless stations and the second wireless stations than the first wireless stations implementing the first time-division duplex configuration and the second wireless stations implementing the second time-division duplex configuration;

wherein the first time-division communication configuration indicates a first time-division duplex uplink/downlink configuration requested by a first wireless network service provider operating the first wireless stations; and wherein the second time-division communication configuration indicates a second time-division duplex uplink/downlink configuration requested by a second wireless network service provider operating the second wireless stations.

16. A system comprising:
a communication management resource operative to:
   receive first input requesting a first time-division communication configuration associated with first wireless stations;
   receive second input requesting a second time-division communication configuration associated with second wireless stations;
   based on spectral analysis of implementing the first time-division communication configuration and the second time-division communication configuration, control implementation of time-division duplex configurations by the first wireless stations and the second wireless stations;
   wherein control of the implementation of time-division duplex configurations includes: i) calculation of an overlap portion in which the first time-division duplex configuration supports uplink wireless communications and the second time-division duplex configuration supports downlink wireless communications, and ii) based at least in part on the calculated overlap portion, determination that simultaneous use of the first time-division duplex configuration by both the first wireless stations and the second wireless stations provides a higher bandwidth efficiency than simultaneous use of the first time-division duplex configuration by the first wireless stations and the second time-division duplex configuration by the second wireless stations;
   wherein control of the implementation of time-division duplex configurations further includes: selection of the first time-division duplex configuration for use by the first wireless stations and the second wireless stations.

17. The system as in claim 16, wherein the communication management resource is further operative to:
select a first option of assigning the first time-division communication configuration for use by both the first wireless stations and the second wireless stations in response to detecting that implementation of the first time-division communication configuration provides an overall net wireless bandwidth gain amongst the first wireless stations and the second wireless stations.

18. The system as in claim 17, wherein the overall net wireless bandwidth gain associated with the first option occurs as a result of wireless bandwidth gain to the first wireless stations being greater than a wireless bandwidth loss to the second wireless stations.

19. The system as in claim 16, wherein the first wireless stations are operated by a first wireless network service provider; and
   wherein the second wireless stations are operated by a second wireless network service provider, the first wireless stations and the second wireless stations operated in different portions of a wireless frequency band.

20. The system as in claim 16, wherein the first time-division communication configuration indicates a first wireless time-division duplex uplink/downlink configuration associated with the first wireless stations; and
   wherein the second time-division communication configuration indicates a second wireless time-division duplex uplink/downlink configuration associated with the second wireless stations.

21. The system as in claim 16, wherein the spectral analysis of the first time-division communication configuration and the second time-division communication configuration includes:
   generating a net wireless bandwidth gain value, BWnet, for a first selectable configuration option over a second selectable configuration option, where:

$$BW\text{net}=[BW1-BW2]*Ma+[BW2*Rb-\min(BW2*Rb, BW1*Ra)+BW2*(1-Rb)-\min(BW2*(1-Rb), BW1*(1-Ra))],$$

where BW1 represents a first bandwidth, the first bandwidth associated with the first selectable option;
   where BW2 represents a second bandwidth, the second bandwidth associated with a second selectable option;
   where Ra represents a percentage of the first time-division communication configuration dedicated to uplink communications;
   where Rb represents a percentage of the second time-division communication configuration dedicated to uplink communications;
   where 1−Ra represents a percentage of the first time-division communication configuration dedicated to downlink communications;
   where 1−Rb represents a percentage of the second time-division communication configuration dedicated to downlink communications;
   where Ma represents a number of the first wireless stations;
   where Mb represents a number of the second wireless stations;
   where min (BW2*Rb, BW1*Ra) is a lesser of BW2*Rb and BW1*Ra; and
   where min (BW2*(1−Rb), BW1*(1−Ra)) is a lesser of BW2*(1−Rb) and BW1*(1−Ra).

22. The system as in claim 16, wherein the communication management resource is further operable to:
   provide a notification of selected time-division communication configurations assigned for use by first wireless stations associated with a first wireless network service provider and second wireless stations associated with a second wireless network service provider.

23. The system as in claim 22, wherein the communication management resource is further operable to:

allocate spectrum for use by the first wireless stations and the second wireless stations, the spectrum allocated from the CBRS (Citizens Broadband Radio Service) band.

24. The system as in claim 16, wherein the communication management resource is further operable to:
receive third input requesting a third time-division communication configuration associated with third wireless stations; and
based on a pair-wise spectral analysis of implementing the first time-division communication configuration, the second time-division communication configuration, and the third time-division configuration, selecting a time-division duplex configuration amongst the first time-division communication configuration, the second time-division communication configuration, and the third time-division configuration providing a maximum bandwidth gain.

25. Non-transitory computer-readable media having instructions stored thereon, the instructions, when carried out by computer processor hardware, cause the computer processor hardware to:
receive first input requesting a first time-division communication configuration associated with first wireless stations;
receive second input requesting a second time-division communication configuration associated with second wireless stations;
based on spectral analysis of implementing the first time-division communication configuration and the second time-division communication configuration, control implementation of time-division duplex configurations by the first wireless stations and the second wireless stations;
wherein control of the implementation of time-division duplex configurations includes: i) calculation of an overlap portion in which the first time-division duplex configuration supports uplink wireless communications and the second time-division duplex configuration supports downlink wireless communications, and ii) based at least in part on the calculated overlap portion, determination that simultaneous use of the first time-division duplex configuration by both the first wireless stations and the second wireless stations provides a higher bandwidth efficiency than simultaneous use of the first time-division duplex configuration by the first wireless stations and the second time-division duplex configuration by the second wireless stations; and
wherein control of the implementation of time-division duplex configurations includes: selection of the first time-division duplex configuration for use by the first wireless stations and the second wireless stations.

26. A method comprising:
receiving first input requesting a first time-division communication configuration associated with first wireless stations;
receiving second input requesting a second time-division communication configuration associated with second wireless stations;
based on spectral analysis of implementing the first time-division communication configuration and the second time-division communication configuration, controlling implementation of time-division duplex configurations by the first wireless stations and the second wireless stations;
wherein controlling the implementation of time-division duplex configurations includes: i) calculating an overlap portion in which the first time-division duplex configuration supports uplink wireless communications and the second time-division duplex configuration supports downlink wireless communications, and ii) based at least in part on the calculated overlap portion, determining that simultaneous use of the first time-division duplex configuration by both the first wireless stations and the second wireless stations provides a lower bandwidth efficiency than simultaneous use of the first time-division duplex configuration by the first wireless stations and the second time-division duplex configuration by the second wireless stations;
wherein controlling the implementation of time-division duplex configurations includes: selecting the first time-division duplex configuration for use by the first wireless stations; and selecting the second time-division duplex configuration for use by the second wireless stations.

27. The method as in claim 26, wherein controlling the implementation of time-division duplex configurations includes:
in response to selecting the first time-division duplex configuration: i) providing notification of assignment of the first time-division communication configuration for use by the first wireless stations; and ii) providing notification of assignment of the second time-division communication configuration for use by the second wireless stations.

* * * * *